United States Patent [19]

Haukaas

[11] Patent Number: 4,690,223
[45] Date of Patent: Sep. 1, 1987

[54] ROD WEEDER ATTACHMENT FOR AN AGRICULTURAL IMPLEMENT

[76] Inventor: Duane C. Haukaas, Box 202, Mortlach Saskatchewan, Canada, R=S0H 3E0

[21] Appl. No.: 872,920

[22] Filed: Jun. 11, 1986

[51] Int. Cl.⁴ .............................................. A01B 39/19
[52] U.S. Cl. ........................................ 172/44; 172/69; 172/705
[58] Field of Search ..................... 172/44, 125, 69, 68, 172/705; 111/52, 85

[56] References Cited

U.S. PATENT DOCUMENTS

| | | | |
|---|---|---|---|
| 1,531,526 | 3/1925 | Thomas | 172/44 |
| 2,699,714 | 1/1955 | Fundingsland | 172/44 |
| 2,862,433 | 12/1958 | Guyer | 172/44 |
| 2,892,504 | 6/1959 | Mowbray | 111/68 X |
| 3,140,678 | 7/1964 | Morris | 111/67 |
| 3,194,321 | 3/1965 | Sande | 172/44 |
| 3,552,496 | 12/1970 | Tasset | 172/125 X |
| 3,651,870 | 3/1972 | Calkings | 172/44 |
| 3,661,101 | 5/1972 | Parsons | 172/44 X |
| 3,768,425 | 10/1973 | Seifert | 172/44 |
| 3,804,179 | 4/1974 | Johnson | 172/510 |
| 4,206,814 | 6/1987 | Isaacs | 172/44 |
| 4,259,872 | 4/1981 | Chandler | 172/106 |
| 4,396,068 | 8/1983 | Handy | 111/85 |

*Primary Examiner*—Richard J. Johson
*Attorney, Agent, or Firm*—Stanley G. Ade

[57] ABSTRACT

A rod weeder attachment for the tool bar of an agricultural implement comprises an arm portion extending rearwardly from a clamp on the tool bar defined by a pair of spaced parallel bars extending rearwardly to a transverse strut. From the strut to the ground is provided a rear arm portion the angle of which can be adjusted relative to the front arm portion. The rear arm portion carries on the lower end a ground wheel for running on the ground and providing drive therefrom. A pair of shanks at opposed ends of the strut extend down to the ground and carry at their lower ends a rod which is driven by a chain mechanism from the ground wheel. Springs allow the arm to lift relative to the tool bar.

20 Claims, 4 Drawing Figures

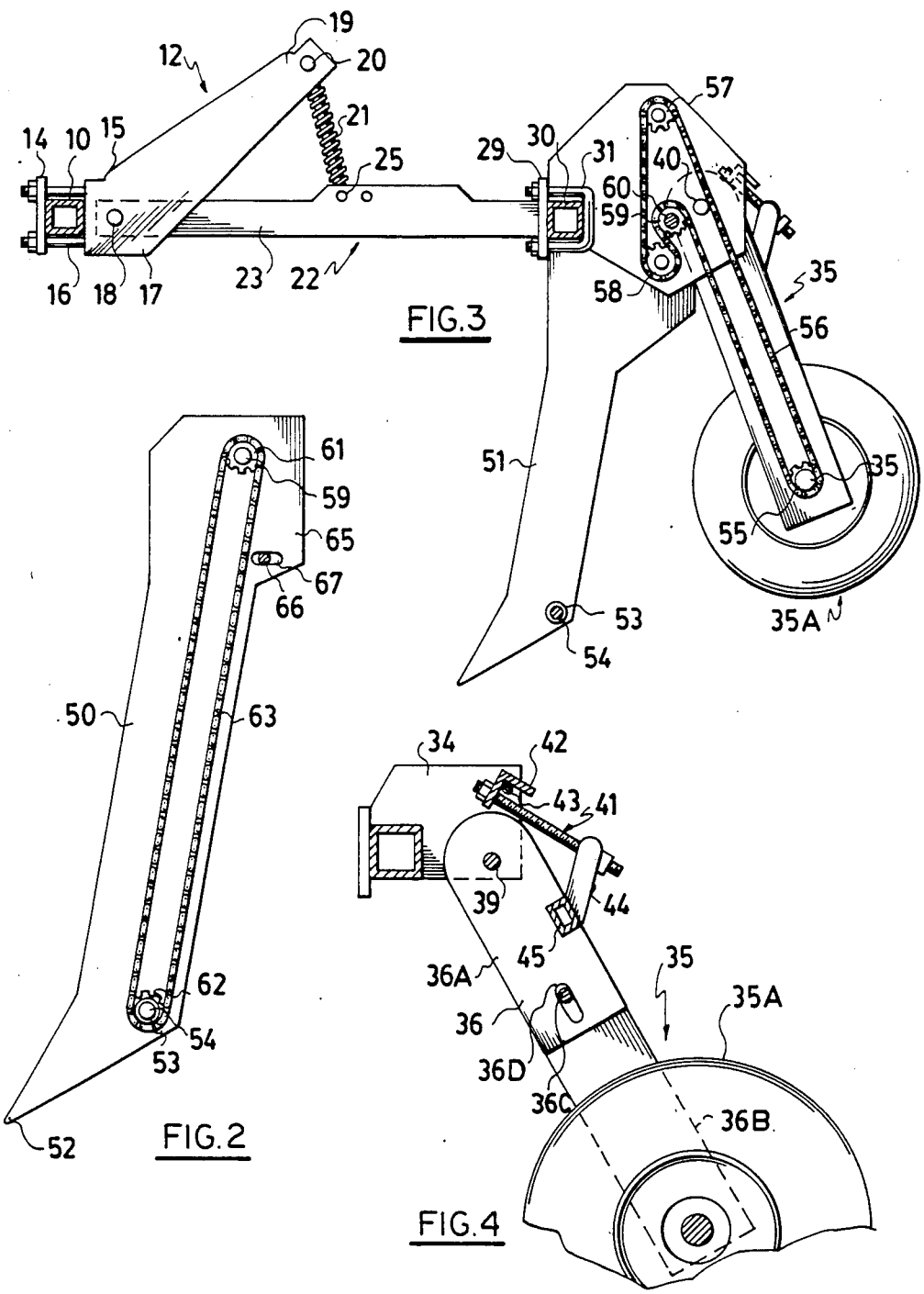

ROD WEEDER ATTACHMENT FOR AN AGRICULTURAL IMPLEMENT

BACKGROUND OF THE INVENTION

This invention relates to a tillage attachment for mounting on agricultural implement of the type comprising a tool bar, ground wheels for supporting the tool bar for movement across the ground and means for causing the tool bar to move in a direction transverse to its length.

Rod weeders are known and are conventional agricultural implements. These generally comprise a tool bar mounted upon ground wheels and attached to a hitch for movement of the tool bar across the ground. The rods are then attached to the tool bar on shanks which extend downwardly from the tool bar with the rods parallel to the tool bar and mounted on bearings at the lower end of the shanks. A number of separate rods can be arranged across the tool bar to match the full length of the tool bar. The rod or each of the rods is then driven by suitable mechanism so that it rotates about a longitudinal axis in a reverse direction relative to a normal rolling direction. Such a device is intended to work just below the soil surface to cut weeds and to lift the weed parts to the surface of the soil where they wither and die.

Rod weeders of this conventional type have been well known for many years and have been manufactured and sold in large numbers. However they have a number of significant disadvantages, the most important of these being that as the level of the ground varies relative to the tool bar due to any local changes in surface height, the depth of the rod relative to the surface of the ground significantly varies and unless the rod is working at exactly the right depth, its effectiveness is seriously reduced.

U.S. Pat. No. 3,552,496 discloses an alternative method of mounting the rods on the tool bar by way of a number of flexible shanks which extend downwardly from the tool bar and carry the rods. This arrangement therefore allows some degree of flexing of the rods relative to the ground. The rod is driven by a spitted ground engaging wheel rearward of the rod.

Generally, therefore, it is well known that the rod weeder arrangement is an effective tillage tool. However the constructions available to date have not made the best advantage of the rod weeder technique and is one of the objects of the present invention to provide an improved device for operating the rod weeder technique.

SUMMARY OF THE INVENTION

According to the first aspect of the invention, therefore, there is provided a tillage attachment device for mounting on an agricultural implement of the type comprising a tool bar, ground wheels for supporting the tool bar from movement across the ground and means for causing the tool bar to move in a direction transverse to its length, the device comprising clamp means for attachment of the device to the tool bar, rigid pivot arm means mounted on said clamp means so as to extend rearwardly therefrom and so as to be pivotal about a horizontal axis at right angles to said arm means, spring biasing means connected between said clamp means and said pivot arm means for biasing said arm means downwardly around said axis, a ground engaging wheel mounted on said arm means remote from said clamp means for running on the ground rearwardly of and following said tool bar, said ground wheel being of a type such that its engagement with the ground controls the height of said arm means from the ground, strut means rigidly mounted upon and extending transversely to said arm means, two vertical ground engaging rigid shank means each rigidly mounted on said strut means at horizontally spaced locations and extending downwardly therefrom for engagement with the ground, a rod extending between said shank means at respective lower ends thereof, bearing means mounting said rod on each of said shank means for rotation relative thereto about a longitudinal axis of said rod and drive means for communicating drive from said ground wheel to said rod for rotating said rod.

The device, therefore, is designed as an attachment to the tool bar of an existing agricultural implement. Thus for example the device can be attached behind a cultivator so that the rod weeder attachment operates behind the cultivator.

Each attachment is of limited width and is supported or guided relative to the ground surface by the ground wheel. The vertical spacing the rod and the ground wheel is rigid and fixed so the ground wheel accurately controls the depth of the rod over a relatively narrow width of the implement so the rod is properly controlled to the required depth. An adjustment mechanism can be provided for example by forming the arm in a first portion and a second portion with a second portion inclined to the first and adjustable in its inclination.

Preferably the device includes a single wheel arranged centrally of the device, the wheel having an inflated rubber tire so that it can properly act as a depth control while communicating drive from the wheel to the rod.

In addition the arm is preferably arranged substantially centrally and the vertical shanks are supported on struts extending outwardly to the sides of the arm. Furthermore the arms can be formed as two parallel bars clamped separately onto the tool bar and extending separately rearwardly to the transverse strut means.

The device can therefore be attached simply behind any required agricultural implement with the depth of operation of the rod control separately of the tool bar strictly by the ground engaging wheel.

According to a second aspect of the invention there is provided an agricultural implement of the type comprising a tool bar, ground wheels for supporting the tool bar from movement across the ground and means for causing the tool bar to move in a direction transverse to its length, and an attachment device comprising clamp means for attachment of the device to the tool bar, rigid pivot arm means mounted on said clamp means so as to extend rearwardly therefrom and so as to be pivotal about a horizontal axis at right angles to said arm means, spring biasing means connected between said clamp means and said pivot arm means for biasing said arm means downwardly around said axis, a ground engaging wheel mounted on said arm means remote from said clamp means for running on the ground rearwardly of and following said tool bar, said ground wheel being of a type such that its engagement with the ground controls the height of said arm means from the ground, strut means rigidly mounted upon and extending transversely to said arm means, two vertical ground engaging rigid shank means each rigidly mounted on said strut means at horizontally spaced locations and extending downwardly therefrom for engagement with the ground, a rod extending between said shank means at respective lower ends thereof, bearing means mounting said rod on each of said shank means for rotation relative thereto about a longitudinal axis of said rod and drive means for communicating drive from said ground wheel to said rod for rotating said rod.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 2 is a view along the lines 2—2 of FIG. 1.

FIG. 3 is a view along the lines 3—3 of FIG. 1.

FIG. 4 is a view along the lines 4—4 of FIG. 1.

In the drawings like characters of reference indicate corresponding parts in the different figures.

DETAILED DESCRIPTION

Figure 1:
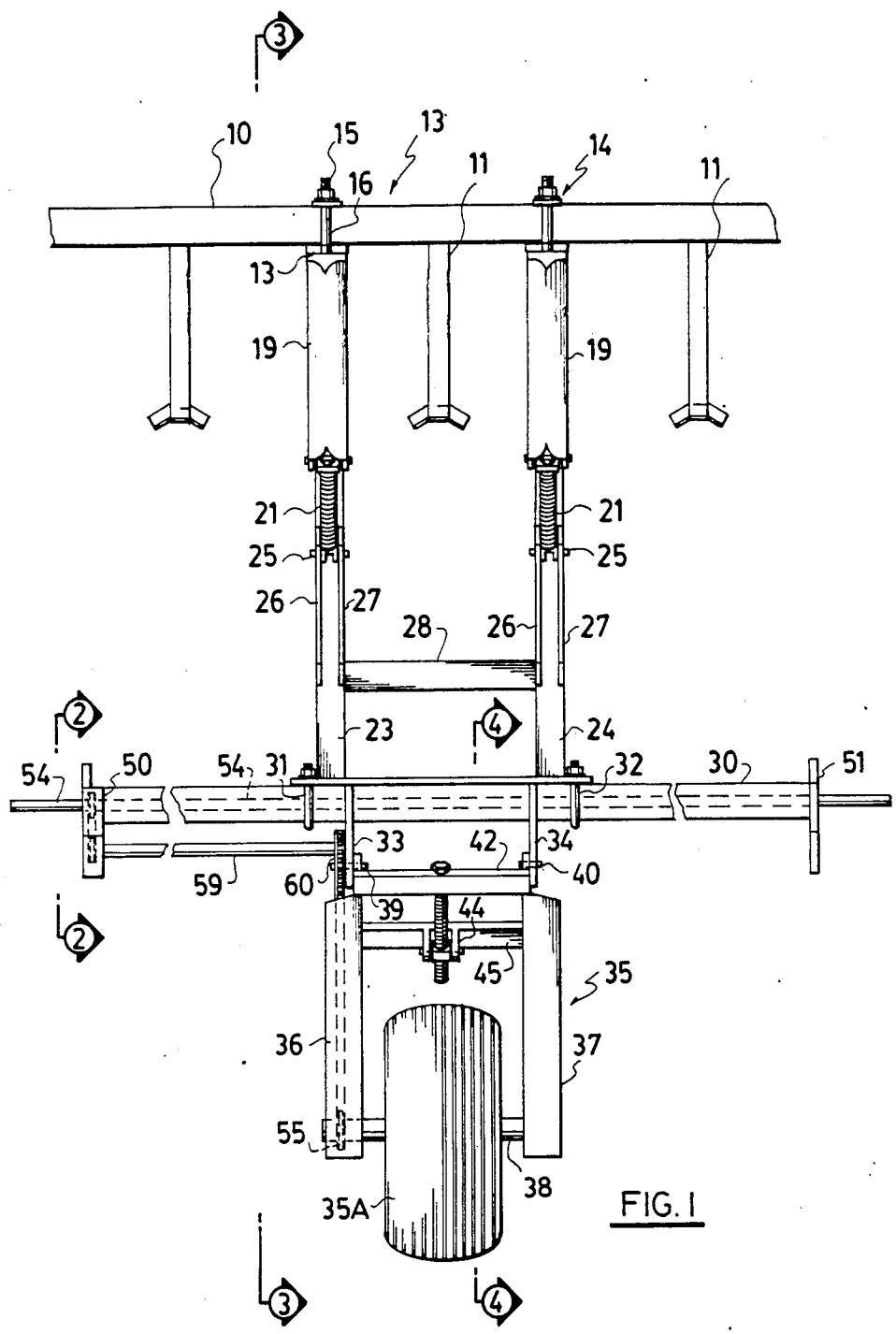
FIG. 1 is a top plan view of a tillage device for attachment to a tool bar according to the invention.

A tool bar of an agricultural implement is indicated generally at 10 with ground wheels for the tool bar and a hitch for the tool bar omitted for convenience of illustration but are of conventional type. Cultivator shanks are indicated schematically at 11 to show that the tool bar is of a conventional agricultural implement for example a cultivator.

The device comprises a clamp section for attachment to the tool bar 10. The clamp section generally indicated at 12 comprises a pair of clamp members 13 and 14. Each comprises a plate 15 for attachment on a front side of the bar 10 and a plate 16 for attachment on a rear side with the plates coupled by bolts 16 crossing over the top and bottom of the tool bar in conventional manner. The rear plate 15 is attached to side plates 17 which define a lower pivot section carrying a pivot pin 18 and an upwardly extending spring receiving section 19 which carries a pivot pin 20 at an upper end for receiving a compression spring 21. Each of the clamp members 13 and 14 is substantially identical and spaced along the length of the tool bar.

The device further comprises a pivot arm generally indicated at 22 in the form of 2 parallel bars 23 and 24 which extend rearwardly and horizontally from the pivot pin 18 so that each of the bars is pivotally mounted about the horizontal axis defined by the pins 18 in a respective one of the clamp members 13 and 14.

The bars 23 and 24 are biased downwardly by the compression springs 21 which are coupled between the pivot pin 20 and a pivot pin 25 mounted transversely of a pair of upstanding flanges 26 and 27 on the upper side of the bar 23. Thus the bars 23 and 24 can commonly pivot upwardly and downwardly about the axis defined by the pins 18 but are biased downwardly by the springs 21 with upward movement against the spring bias being accommodated by the pivot pins 25 and 20. A transverse bar 28 interconnects the bars 23 and 24 so as to maintain them in common pivotal movement and so that the clamp members and bars form a rigid interconnected structure which resists twisting about an axis at right angles to the tool bar 10 and symetrically relative to the arm section 22.

The arm section 22 carries on an outermost end a flat plate 29 which is clamped to a transverse elongated strut 30 by u-shaped clamps 31 and 32 which are bolted through the plate 29. Welded to the transverse strut 30 at positions aligned with the bars 23 and 24 is a pair of plates 33 and 34 which are shown in plan in FIG. 1. The plate 33 shown in elevation in FIG. 3 and the plate 34 shown in elevation in FIG. 4. Each of the plates therefore extends rearwardly of the strut 30 and together they provide a pair of support plates for pivotally mounting a second arm portion generally indicated at 35 for carrying a ground wheel 35A. The second arm portion 35 comprises a pair of two separate bars 36 and 37 which carry at their lower ends an axle 38 for the wheel 35. The bars 36 and 37 extend generally upwardly and forwardly from the axle 35 to a pair of pivot pins 39, 40 which pass through the plates 33, 34 respectively and are aligned to allow common pivotal movement of the second arm portion 35 relative to the first arm portion including the plates 33 and 34.

That pivotal movement is halted at a required location by an adjustment screw 41. One end of the adjustment screw 41 is attached to an angle iron 42 which extends across between the plates 33 and 34 and is mounted upon a pivot pin 43 to allow the angle iron to move to take up the required location relative to the screw 41. The screw passes through one leg of the angle iron as shown best in FIG. 4 and the other end of the screw is attached to a pair of lugs 44 which extend upwardly from a transverse bar 45 interconnecting the bars 36 and 37. Thus by adjustment of the screw 41, the position of the inclination of the rear portion 35 relative to the front portion 22 can be adjusted so that generally the front arm portion is horizontal as shown in FIG. 3 with the rear arm portion extending rearwardly and downwardly therefrom for engagement of the wheel 35A with the ground. Adjustment of the inclination causes the transverse strut 30 to be raised and lowered relative to the tool bar 10.

The ground wheel 35A is of a type having an inflatable rubber tire so that it can run on the ground without causing significant alteration to the ground and yet it is rotated by contact with the ground. In addition the contact of such a tire with the ground can accurately control the height of the strut relative to the ground. The length of the arms 36 and 37 can be adjusted as they are formed from two separate portions indicated at 36A and 36B coupled at a bolt 36C which is positioned within a slot 36D.

On an opposed end of the strut 30 which extends outwardly to respective sides of the arm 22 is positioned a vertically downwardly extending shank indicated respectively at 50 and 51. Each of the shanks is arranged at right angles to the strut and is aligned the vertical plane and extends downwardly and slightly forwardly to a ground engaging tire portion 52 which is shaped to engage into the ground and move forwardly along the ground slightly beneath the surface with movement of the tool bar. A lower rear edge of the shank carries a bearing 53 within which is carried a rod 54 which extends parallel to the strut 30 and at a position generally vertically beneath the strut 30. The bearings 53 allow the rod 54 to rotate about its own axis at a position slightly beneath the surface of the soil.

Drive to the rod 54 is obtained from the ground wheel 35A. Specifically a sprocket 55 is carried on the axle 35 of the ground wheel within the confines of the bar 36 which for this purpose is formed as a channel section. The sprocket 35 carries and drives a chain 56 which extends along the bar 36 to an upper idler sprocket 57 carried on the plate 33. A second idler sprocket 58 is carried also on the plate 33 beneath the sprocket 57. A drive shaft 59 extends from a sprocket 60 on the plate 33 to the end shank 50. The sprocket 60 is positioned above the sprocket 58 so as to receive the outside of the chain 56 and to define a return portion of the chain directed down to the sprocket 55. Thus rotation of the ground wheel 35A in a forward direction by forward movement of the tool bar causes the shaft 59 to be driven in a reverse direction that is a clock-wise direction as visible in FIG. 3. The shaft 59 communicates the drive from the wheel 35A to the left hand shank 50 within which is positioned a pair of sprockets 61 and 62 one of which mounted on the shaft 59 and the other on the rod 54 with a chain 63 therebetween for directly communicating drive to the rod 54. Thus in addition rod 54 rotates in a reverse direction relative to the forward direction so that in operation it tends to throw weeds to the surface of the soil.

The shanks 50 and 51 comprise an upper plate portion 65 attached to the strut 30 and a downwardly extending portion the angle of which can be adjusted by a bolt 66 within a slot 67.

It will be appreciated therefore that the device formed by the rearwardly and downwardly extending arm portions carrying the single ground wheel 35A is accurately located in its height by the engagement of the ground wheel 35A with the ground. The height of the strut 30 thus directly controls the height of the rod 54 in view of the rigid connection provided by the shanks 50 and 51. The length of the rod 54 is arranged to be of the order of 5 feet thus defining the width of operation of the attachment device in the ground. This width is sufficiently limited that the depth of the rod beneath the ground can be accurately controlled by the running of the wheel 35A on the ground.

In an alternative arrangement (not shown) the forward arm portion can be formed by a single bar singly clamped to the tool bar. As a further alternative, the bars 23 and 24 forming the front arm portion can be spaced further outwardly toward the ends of the transverse strut 30.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A tillage attachment device for mounting on an agricultural implement of the type comprising a tool bar, ground wheels for supporting the tool bar for movement across the ground and means for causing the tool bar to move in a direction transverse to its length, the device comprising clamp means for attachment of the device to the tool bar, rigid pivot arm means mounted on said clamp means so as to extend rearwardly therefrom and so as to be pivotal about a horizontal axis at right angles to said arm means, spring biasing means connected between said clamp means and said pivot arm means for biasing said arm means downwardly around said axis, a ground engaging wheel mounted on said arm means remote from said clamp means for running on the ground rearwardly of and following said tool bar, said ground wheel being of a type such that its engagement with the ground controls the height of said arm means from the ground, strut means rigidly mounted upon and extending transversely to said arm means, two vertical ground engaging rigid shank means each rigidly mounted on said strut means at horizontally spaced locations and extending downwardly therefrom for engagement with the ground, a rod extending between said shank means at respective lower ends thereof, bearing means mounting said rod on each of said shank means for rotation relative thereto about a longitudinal axis of said rod and drive means for communicating drive from said ground wheel to said rod for rotating said rod.

2. The invention according to claim 1 including means for adjusting a vertical spacing between said rod and said ground wheel.

3. The invention according to claim 1 wherein said arm means includes a first portion thereof extending rearwardly from said clamp means and a second portion thereof inclined relative to the first portion and pivotally mounted relative to the first portion, said second portion carrying on an end thereof remote from said first portion said ground wheel and including means for adjustment of the angle of inclination of said second portion relative to said first portion whereby to adjust the vertical height of the ground wheel relative to said first portion to adjust the vertical height of the ground wheel relative to said rod.

4. The invention according to claim 3 wherein said first arm portion is substantially horizontal and wherein said second arm portion is inclined downwardly therefrom.

5. The invention according to claim 1 wherein said arm means is arranged substantially centrally of said device and wherein said strut means is arranged to extend outwardly to respective sides thereof.

6. The invention according to claim 1 wherein in said drive means comprises a first chain extending along said arm means from said ground wheel to said strut means and a second chain extending from said strut means along one of said shank means to said rod and including a drive shaft extending from said arm means to said shank means substantially along said strut means.

7. The invention according to claim 1 wherein said ground wheel includes an inflated rubber tire.

8. The invention according to claim 1 wherein said clamp means includes a spring receiving strut extending in a direction upward away from said arm means whereby said spring biasing means extends from said arm means to said strut.

9. The invention according to claim 1 including a single ground wheel only arranged substantially centrally of said strut means and symmetrically between said vertical shank means.

10. The invention according to claim 1 wherein in said arm means comprises two elongate bars arranged in parallel spaced relation.

11. The invention according to claim 10 wherein said bars are arranged inwardly of said vertical shank means and symmetrically about a central axis of said device.

12. The invention according to claim 10 when each of said bars includes a separate spring biasing means actuable between said bar and upwardly extending strut on said clamp means.

13. An agricultural implement of the type comprising a tool bar, ground wheels for supporting the tool bar for movement across the ground and means for causing the tool bar to move in a direction transverse to its length, and an attachment device comprising clamp means for attachment of the device to the tool bar, rigid pivot arm means mounted on said clamp means so as to extend rearwardly therefrom and so as to be pivotal about a horizontal axis at right angles to said arm means, spring biasing means connected between said clamp means and said pivot arm means for biasing said arm means downwardly around said axis, a ground engaging wheel mounted on said arm means remote from said clamp means for running on the ground rearwardly of and following said tool bar, said ground wheel being of a type such that its engagement with the ground controls the height of said arm means from the ground, strut means rigidly mounted upon and extending transversely to said arm means, two vertical ground engaging rigid shank means each rigidly mounted on said strut means at horizontally spaced locations and extending downwardly therefrom for engagement with the ground, a rod extending between said shank means at respective lower ends thereof, bearing means mounting said rod on each of said shank means for rotation relative thereto about a longitudinal axis of said rod and drive means for communicating drive from said ground wheel to said rod for rotating said rod.

14. The invention according to claim 13 including means for adjusting a vertical spacing between said rod and said ground wheel.

15. The invention according to claim 13 wherein said arm means includes a first portion thereof extending rearwardly from said clamp means and a second portion thereof inclined relative to the first portion and pivotally mounted relative to the first portion, said second portion carrying on an end thereof remote from said first portion said ground wheel and including means for adjustment of the angle of inclination of said second portion relative to said first portion whereby to adjust the vertical height of the ground wheel relative to said first portion to adjust the vertical height of the ground wheel relative to said rod.

16. The invention according to claim 15 wherein said first arm portion is substantially horizontal and wherein said second arm portion is inclined downwardly therefrom.

17. The invention according to claim 13 wherein said arm means is arranged substantially centrally of said device and wherein said strut means is arranged to extend outwardly to respective sides thereof.

18. The invention according to claim 13 wherein said drive means comprises a first chain extending along said arm means from said ground wheel to said strut means and a second chain extending from said strut means along one of said shank means to said rod and including a drive shaft extending from said arm means to said shank means substantially along said strut means.

19. The invention according to claim 13 wherein said ground wheel includes an inflated rubber tire.

20. The invention according to claim 13 herein said clamp means includes a spring receiving strut extending in a direction upward away from said arm means whereby said spring biasing means extends from said arm means to said strut.

* * * * *